United States Patent [19]

Boll et al.

[11] 4,191,544
[45] Mar. 4, 1980

[54] GAS CLEANING APPARATUS

[75] Inventors: Richard H. Boll; Walter C. Lapple, both of Alliance, Ohio

[73] Assignee: The Babcock & Wilcox Company, New Orleans, La.

[21] Appl. No.: 887,579

[22] Filed: Mar. 17, 1978

[51] Int. Cl.² .............................................. B01D 53/12
[52] U.S. Cl. ....................................... 55/390; 55/474; 422/147
[58] Field of Search ..................... 55/34, 77, 99, 390, 55/459 R, 474; 422/140, 142, 144, 147, 230, 231, 234

[56] References Cited

U.S. PATENT DOCUMENTS

| | | | |
|---|---|---|---|
| 1,265,763 | 5/1918 | Fender | 55/459 R X |
| 2,054,441 | 9/1936 | Peebles | 55/459 R X |
| 2,885,272 | 5/1959 | Kimberlin, Jr. et al. | 422/147 X |
| 2,962,362 | 11/1960 | Moorman | 422/142 |
| 3,026,186 | 3/1962 | Coty | 422/147 X |
| 3,485,014 | 12/1969 | Atsukawa et al. | 55/474 X |
| 3,677,715 | 7/1972 | Morrison et al. | 55/474 X |
| 3,798,877 | 3/1974 | Lamb | 55/474 X |
| 4,061,476 | 12/1977 | Holter et al. | 55/99 X |

FOREIGN PATENT DOCUMENTS 442514  4/1927  Fed. Rep. of Germany ............. 55/474

Primary Examiner—Robert H. Spitzer
Attorney, Agent, or Firm—Robert J. Edwards; Edward A. Steen; Stephen R. Doody

[57] ABSTRACT

An apparatus and method for removing very finely divided alkali fumes and other particulate material from a coal-gasifier make-gas comprising the introduction of char granules into the constricted passage of a venturi-shaped gas duct to adsorb the very fine particulate from the make-gas flowing therethrough, and centrifugally separating the fume-laden char granules from the make-gas.

2 Claims, 3 Drawing Figures

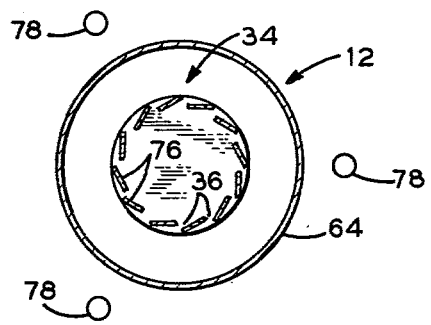
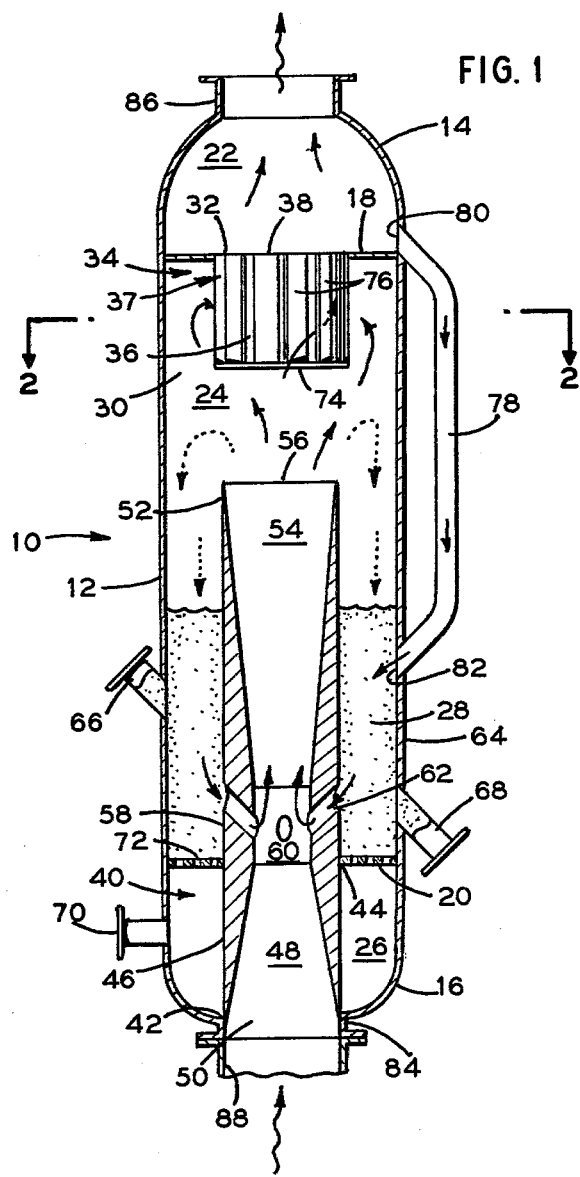

GAS CLEANING APPARATUS

BACKGROUND OF THE INVENTION

The present invention is concerned with the removal of contaminants from a gaseous medium, and more particularly with an apparatus and method employing char to adsorb alkali fumes and other very finely divided particulate material from a gasifier make-gas.

The term "adsorb" conventionally implies chemical attachment of molecules to a surface without their penetration beneath that surface so as to accumulate in the bulk of the material that is the adsorbent. The meaning of the term "adsorb" as used to describe the present invention is broadened to imply attachment of very fine particles to the surface of larger particles by any one of a number of mechanisms such as Van der Waal forces, electrostatic attraction, surface tension, etc.

An object of this invention is to provide a means for recycling char so as to increase the mass-flow ratio of char to gas. Another object is to provide a means for introducing char into the gas stream wherein the char is moving at substantially zero velocity as compared to the gas stream. A further object is to provide a means for removing alkali fumes, formed of minute particles, e.g. 3 microns or less, from a high temperature gas stream without having to cool the gas stream. Yet another object is to provide a means for separating char from the gas stream after the char has adsorbed the alkaki fumes in the gas stream.

SUMMARY OF THE INVENTION

The present invention provides a gas cleaning apparatus and method for removing alkali fumes and the like from a coal-gasifier make-gas by contacting the fumes with char granules in a high velocity-venturi-type gas duct so as to collect the fumes on the surface of the granules. In the further description of the invention we shall use the term "alkali fume" to mean that plus all other very fine particulate such as soot, finely divided ash, etc.

The main embodiment of the invention comprises an upright vessel whose interior is divided into upper, intermediate and lower chambers. A transversely oriented perforated plate separates the intermediate and lower chambers. A bed of char granules occupies a lower portion of the intermediate chamber and a pressurized gas is admitted to the lower chamber and passed through the perforated plate to maintain the char granules in a dense phase fluidized state. At least one venturi-shaped duct extends through the lower chamber and into the intermediate chamber and has a gas inlet disposed outside the vessel and a gas outlet communicating with the intermediate chamber above the fluidized bed. The venturi-shaped duct is formed with convergent, constricted and divergent passages consecutively disposed in the direction of gas flow. Conduit means interconnect the fluidized bed and the constricted passage to introduce char granules into the gas to adsorb alkali fumes therefrom. A centrifugal type separator is disposed above and in spaced coaxial relation with the venturi-shaped duct and has a gas inlet communicating with the intermediate chamber and a gas outlet communicating with the upper chamber. The action of the gas entering the separator produces a swirling flow outside and below the separator thereby causing most of the alkali fume-laden char granules to be centrifugally separated and to gravitate along the chamber wall to the fluidized bed. Considerable swirl persists in the gas flow discharge from the separator into the upper chamber and the remaining alkali fume-laden char granules are centrifugally separated in the upper chamber and gravitate through downcomers to the fluidized bed. The substantially decontaminated gas flows upwardly through the upper chamber for discharge from the vessel.

The alternate embodiment of the invention comprises an arrangement whereby the fluidized bed, the venturi-shaped duct and the separator are not contained within a common vessel. The arrangement includes a means for admitting gas contaminated with alkali fumes and usually char to a venturi-shaped duct. Char granules from a fluidized bed are introduced into the constricted passage of the venturi-shaped duct to adsorb the alkali fumes in the gas. The char and gas discharging from the venturi-shaped duct are conveyed to a tangential-entry type cyclone separator wherein the alkalifume-laden char granules are centrifugally separated from the gas. The separated char granules gravitate to the fluidized bed contained within a separate vessel, and the substantially decontaminated gas passes through an upper outlet of the separator.

BRIEF DESCRIPTION OF THE DRAWINGS

FIG. 1 is a diagrammatic sectional elevation of a gas cleaning apparatus embodying the invention;

FIG. 2 is a sectional plan view taken along line 2—2 of FIG. 1; and

DETAILED DESCRIPTION OF THE PREFERRED EMBODIMENTS

Figure 3:
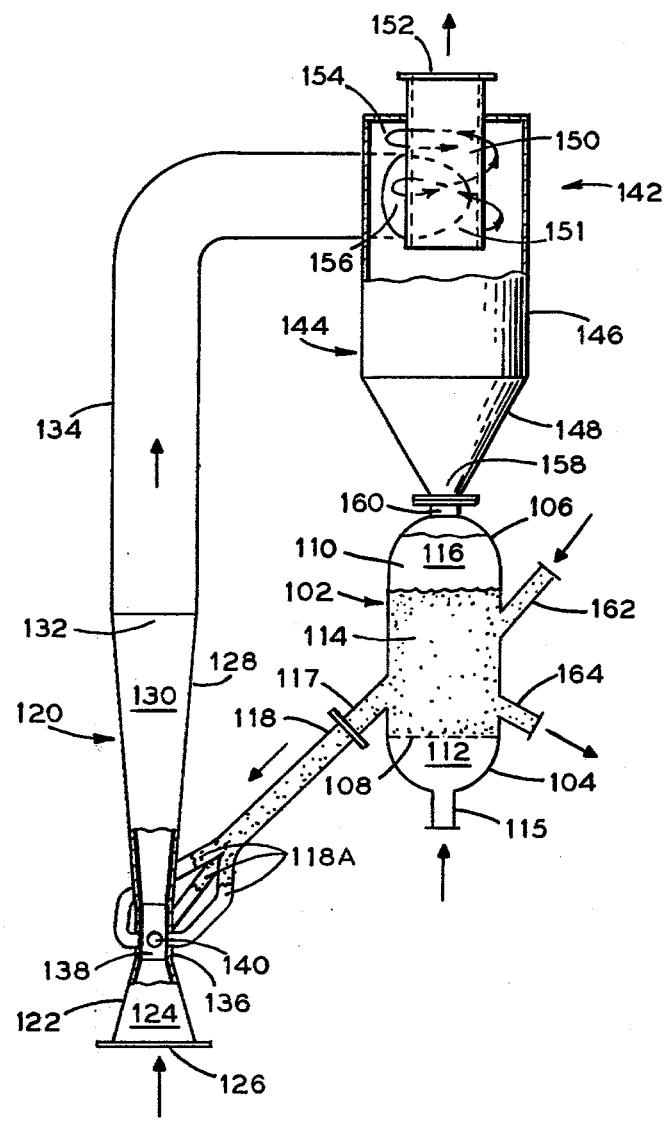
FIG. 3 is a diagrammatic arrangement of an alternate embodiment of the invention.

FIGS. 1 and 2 illustrate a gas cleaning apparatus 10 comprising a vertically elongated cylindrical vessel 12 closed at its opposite ends by an upper head member 14 and a lower head member 16. The vessel 12 is transversely divided by upper and lower plates 18 and 20 into an upper chamber 22, an intermediate chamber 24, and a lower chamber 26. The intermediate chamber 24 contains a bed of dry char granules 28 in a dense fluidized state and a freeboard space 30. The upper plate 18 is formed with a central opening 32 which admits a gas-solids separator 34 having its inlet 37 communicating with the freeboard space 30 and an outlet 38 discharging to the upper chamber 22. The lower plate 20 is perforated to allow the passage of pressurized gas therethrough to maintain the char bed 28 in a dense phase fluidized state.

An upright venturi-shaped gas duct 40 enters through an appropriate opening 42 formed in the vessel lower head member 16 and extends through the lower chamber 26 and through a central opening 44 of the perforated plate 20 and terminates within the freeboard space 30. The gas duct 40 includes a lower section 46 which defines an interior passage 48 convergent in the direction of gas flow and having an inlet 50 for receiving a high temperature make-gas from a coal-gasifier, not shown, and an upper section 52 which defines an interior passage 54 divergent in the direction of gas flow and having an outlet 56 discharging to the freeboard space 30. A venturi throat section 58 is disposed between the upper and lower duct sections 52 and 46 and defines a constricted interior passage 60 communicating with the interior passages 48 and 54. The venturi throat section is formed with circumferentially spaced conduits 62 flow-connecting the fluidized char bed 28 with the constricted passage 60.

The cylindrical wall 64 of vessel 12 is provided with an inlet nozzle 66 sloped downwardly in the direction of the fluidized char bed 28 for delivering fresh char granules to the bed, if required, and an outlet nozzle 68 sloped downwardly in a direction away from the fluidized bed 28 for removing char granules laden with alkali fumes, in order to maintain the desired bed level. The vessel wall 64 also includes an inlet nozzle 70 for admitting a pressurized gas to the lower chamber or plenum 26 for passage through openings 72 in the perforated plate 20 to maintain the char bed 28 in a fluidized state.

The gas-solids separator 34 is disposed above and in coaxial relation with the venturi-shaped gas duct 40. The separator 34 is in the form of a cylinder having an open top defining the separator outlet 38 and a bottom closed by a plate member 74. The cylinder wall of separator 34 is formed of a plurality of elongated vertical slats 76 set at an angle of approximately 70 degrees with respect to the radius of the separator 34 and circumferentially equispaced to define the openings 36 forming the inlet 37 of separator 34.

Three conduits or downcomer pipes 78 are disposed outside of and circumferentially equispaced about an upper portion of vessel 12. The conduits 78 flow-connect the upper and intermediate chambers 22 and 24 through openings 80 located adjacent the upper plate 18, and openings 82 located below the char bed level. The conduits 78 provide the means for returning separated char granules from the upper chamber 22 to the fluidized bed 28. The lower head member 16 of vessel 12 is provided with an inlet nozzle 84 to a conduit 88 for delivering alkali fume-laden make-gas to the venturi-shaped duct 40, whereas the upper head member 14 is fitted with an outlet nozzle 86 for discharging substantially decontaminated make-gas from the upper chamber 22.

During normal operation of the gas cleaning apparatus 10, high temperature make-gas, contaminated with alkali fumes and usually char, is received from a coal-gasifier, not shown, and enters the venturi-shaped duct 40 through the inlet 50 and flows upwardly through the convergent interior passage 48 and is cleaned as it continues on through the constricted and divergent interior passages 60 and 54. As the gas leaves the venturi duct outlet 56, it turns slightly outward and then inward so as to pass through the openings 36 forming the separator inlet 37 and defined by the inclined slats 76. The inclination of the slats 76 with respect to the radius of separator 34 results in gas velocity vectors which are generally tangent to a circle having a diameter approximately half that of the cylindrical wall 64 of vessel 12, thereby producing a swirling flow outside of and below the separator 34. The centrifugal action resulting from the swirling flow throws most of the alkali fume-laden char granules outwardly across the freeboard space 30 causing them to gravitate to the char bed 28, along the inner periphery of the vessel wall 64.

The char bed 28 occupies a lower portion of the intermediate chamber 24 and surrounds an intermedite exterior portion of the venturi-shaped duct 40. A controlled quantity of suitable gaseous medium, e.g., decontaminated make-gas, is supplied to the plenum 26 and passes through the openings 72 of plate 20 to maintain the char bed 28 in a dense fluidized state.

The cleaning of the high temperature make-gas is accomplished with the introduction of dense phase streams of fluidized char granules through the conduits 62 for discharge at substantially zero axial velocity into the stream of make-gas passing through the constricted passage 60. Conduits 62 are sized so as to produce a char-to-gas weight-flow ratio in the range of 0.3 to 3.0 according to the desired degree of alkali-fume adsorption. The char granules adsorb the alkali fumes in the make-gas and a majority of the granules are thereafter separated from the make-gas by centrifugal force resulting from the swirling motion of the gas as it passes upwardly through the freeboard space 30. The separated char granules laden with alkali fumes gravitate to the fluidized bed 28. Considerable swirl persists in the gas flow exiting from the separator 34, and the alkali fume-laden char granules that were not separated from the makegas in the freeboard space 30 are separated in the upper chamber 22 where they circulate along the lower periphery of chamber 22 for return to the fluidized char bed 28 through the conduits 78.

FIG. 3 illustrates an alternate embodiment wherein the fluidized char bed, the venturi-shaped duct and the gas-solids separator are not contained within a common vessel.

Accordingly, there is shown a vessel 102 closed at its opposite ends by a lower head member 104 and an upper head member 106. The vessel 102 is transversely divided by the perforated plate 108 into an upper compartment 116 and a lower compartment or fluidizing gas plenum 112. The upper compartment 116 contains a bed of dry char granules 114 in a dense phase fluidized state and a freeboard space 110. The lower head member 104 is provided with an inlet connection 115 for admitting a pressurized gas to the plenum 112 for passage through the perforated plate 108 to fluidize the char bed 114. The vessel 102 includes an outlet connection 117 which communicates with the fluidized bed 114 to allow char granules to be conveyed through conduits 118 and 118A to a venturi-shaped duct 120.

The venturi-shaped duct 120 includes a lower section 122 which defines an interior passage 124 convergent in the direction of gas flow and having an inlet 126 for receiving a high temperature make-gas from a coal-gasifier, not shown, and an upper section 128 which defines an interior passage 130 divergent in the direction of gas flow and having an outlet 132 discharging to a conduit 134. A venturi throat 136 is disposed between the upper and lower sections 128 and 122 and defines a constricted interior passage 138 communicating with the interior passages 124 and 130. The venturi throat 136 is formed with circumferentially spaced openings 140 communicating with corresponding branch sections 118A of conduit 118 to receive char granules from the fluidized bed 114. Openings 140 and conduits 118A are sized so as to produce a char-to-gas flow ratio in the range of 0.3 to 3.0 according to the desired degree of alkali fume adsorption.

The conduit 134 discharges into a vortex forming device 142 which is preferably in the form of a tangential-inlet-type cyclone separator. The device 142 includes a housing 144 comprised of a cylindrical upper section 146 and an inverted frustoconical lower section 148. An upright open-ended cylindrical member 150 is concentrically disposed within an upper portion of the section 146 to define a central passage 151 forming an upper outlet 152 from the housing 144. The member 150 is radially spaced from the housing 144 to form an annular passage 154 therebetween. A tangentially oriented inlet 156 connects the discharge end of conduit 134 with the annular passage 154. The section 148 includes a bottom opening which defines a lower outlet 158 from the housing 144, the oulet 158 communicates with the vessel 102 through an inlet connection 160.

During normal operation of the gas cleaning apparatus described as the alternate embodiment, high temperature make-gas contaminated with alkali fumes and usually char, is received from a coal-gasifier, not shown, and is admitted to the inlet 126 of the venturi-shaped duct 120 and flows upwardly through the convergent and constricted passages 124 and 138 and is cleaned by the char granules supplied from the fluidized bed 114 by the conduits 118 and 118A and discharged through the openings 140 into passage 138. The make-gas and the char granules continue the upward flow through the divergent section 130 and through the conduit 134 and are tengentially discharged into the cyclone separator 142. The alkali fume-laden char granules are centrifugally separated from the make-gas and gravitate to the lower section 148 of separator 142 and are returned via the outlet 158 and the connection 160 to the fluidized bed 114. The substantially decontaminated gas passes through the central passage 151 and the outlet 152.

If required, fresh char granules may be added to the fluidized bed 114 through an inlet connection 162. Char granules laden with alkali fumes are removed through an outlet connection 164, in order to maintain the desired bed level.

While in accordance with the provisions of the statutes there is illustrated and described herein a specific embodiment of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A gas cleaning apparatus comprising a vessel, transverse plates dividing the vessel into upper, intermediate and lower chambers, a fluidized bed of contaminant adsorbing particles, the fluidized bed occupying a lower portion of the intermediate chamber, venturi-shaped duct means disposed within the vessel and having a gas outlet communicating with the intermediate chamber at a level above the fluidized bed, the duct means being formed with a constricted interior passage, means for admitting a stream of contaminated gas to the duct means, conduit means connecting the fluidized bed with the constricted passage to introduce the adsorbing particles into the gas stream thereby removing contaminants therefrom, means for centrifugally separating contaminant-laden particles from the gas stream, the separating means being disposed above and in spaced coaxial relation with the duct means and having a gas inlet communicating with the intermediate chamber and a gas outlet communicating with the upper chamber, means for discharging substantially decontaminated gas from said upper chamber, and means for returning the separated particles to said fluidized bed.

2. The apparatus according to claim 1 wherein said means for returning separated particles includes at least one conduit interconnecting the upper chamber to said fluidized bed.

* * * * *

UNITED STATES PATENT AND TRADEMARK OFFICE
CERTIFICATE OF CORRECTION

PATENT NO. : 4,191,544
DATED : March 4, 1980
INVENTOR(S) : Richard H. Boll et al.

It is certified that error appears in the above—identified patent and that said Letters Patent is hereby corrected as shown below:

Column 3, line 34, after "84" and before "to" insert

-- connected --.

Signed and Sealed this

Second Day of September 1980

[SEAL]

Attest:

SIDNEY A. DIAMOND

Attesting Officer     Commissioner of Patents and Trademarks